Patented Feb. 28, 1928.

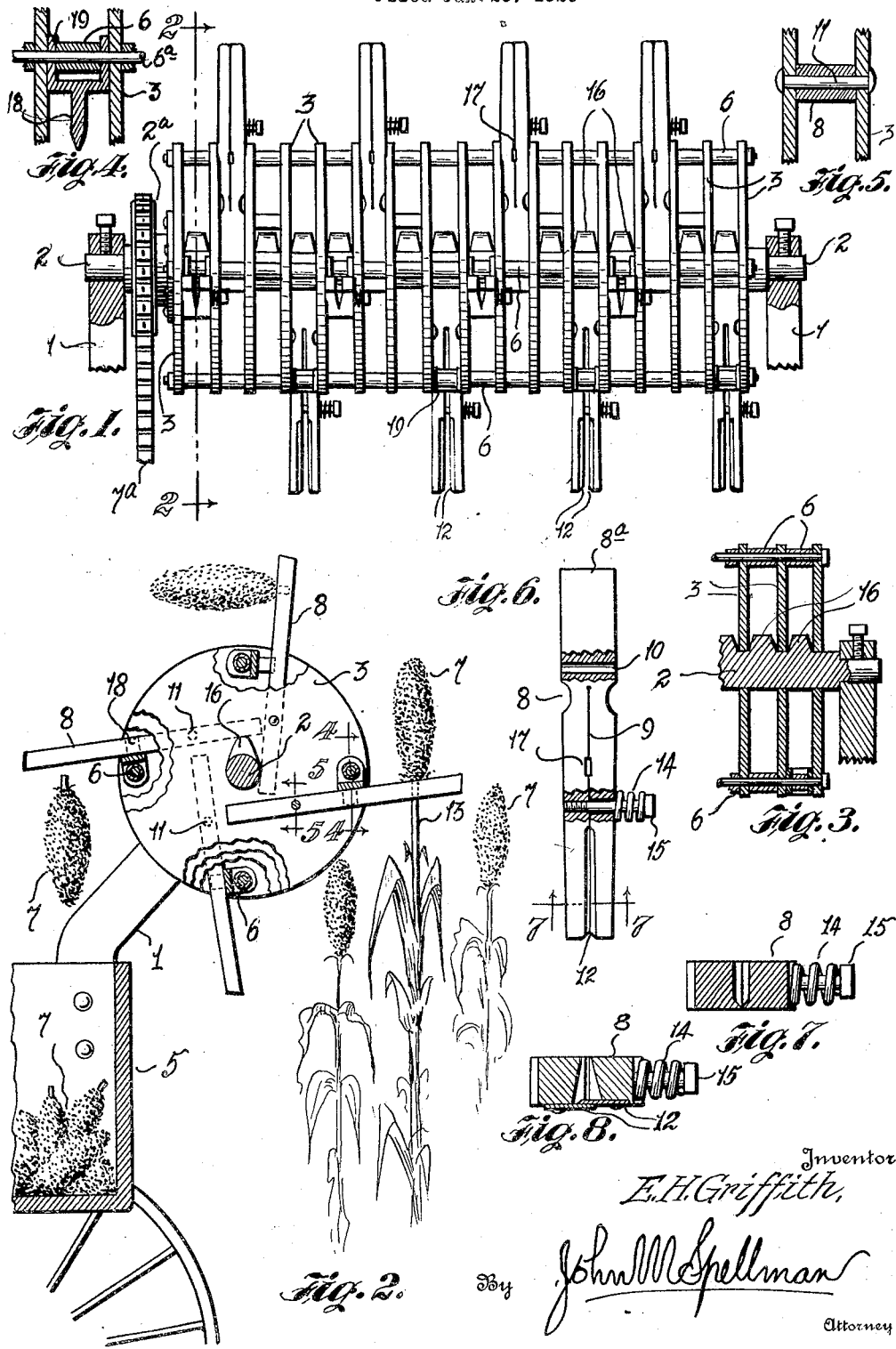

1,660,554

UNITED STATES PATENT OFFICE.

ERNEST H. GRIFFITH, OF GOULDBUSK, TEXAS.

GRAIN-HEADING MACHINE.

Application filed January 29, 1926. Serial No. 84,571.

This invention relates to improvements in machines for heading milo-maize, kaffir corn, cane and the like, and it relates more particularly to the novel arrangement and construction of the parts thereof.

The particular object of the invention is to provide a machine of this nature which will gather and cut off the heads of milo-maize, kaffir corn, cane or the like, at the base of the grain or head thereof, as the stalk of the grain contains a sap, particularly at harvesting time, which causes deterioration of the grain after storage. While various types of these machines are in use, the present invention is designed to effect the severance of the head of grain in a more efficacious manner so as to leave little or only a small portion of the stalk on the head of grain.

A further object of the invention is to provide a machine of this nature which will be adapted to be attached to and operated as a part of an ordinary wagon or motor truck, or as a complete machine in itself, the heading and cutting device deriving motion from moving parts of the truck or vehicle upon which it is mounted.

With the above and other and further objects in view, the invention will be better understood from a perusal of the following description, in connection with the accompanying drawings and wherein:

Figure 1 is a top or plan view of the machine and illustrating in part the means of connecting it to the drive of a wagon, motor truck or the like.

Figure 2 is a vertical sectional view along line 2—2 of Figure 1 and illustrating the machine in operation.

Figure 3 is a partial detail longitudinal sectional view of the disks and supporting shaft.

Figures 4 and 5 are vertical sectional views, along lines 4—4 and 5—5, respectively, of Figure 2.

Figure 6 is an enlarged detail view of one of the gathering and cutting arms, and Figure 7 is a cross-sectional view along line 7—7 of Figure 6. Figure 8 illustrating a cross sectional view of a modified form of the arms shown in Figure 6.

In the drawings the numeral 1 denotes one of a pair of supports affixed to the front of a motor truck, or wagon, which is drawn through the maize or other field crop, a stationary shaft 2 carrying the disks 3 and arms 4 extending across the body of the wagon, harvester or motor truck 5 and slightly in front thereof or if preferred the shaft 2 may be extended out from one side of the machine into the crop of plants and a chute disposed under the disks and connected to the vehicle to convey the collected crop thereto.

One end of the shaft 2 has a sprocket $2^a$ with chain drive 7, the latter being connected to the drive axle of the vehicle. This sprocket is bolted to an outer disk 3, and the remainder of the disks 3 are loosely spaced apart on the shaft 2. These disks are further supported and held in rigid relationship to each other by several tubular spacer elements 6, disposed on a rod $6^a$, properly spaced from the shaft 2.

The means employed for collecting and severing the heads 7 of maize or other crop are provided for by the arms 8, four of which in the present instance are shown spaced around the sides of the disks 3. One of these arms is illustrated in Figure 6 and each arm has a blunt end $8^a$ and the body of the arm is slit at 9 to a point just below an aperture 10, the latter for the purpose of providing a support for a pin 11 which pivots the arm in position on the disk as shown in Figure 2. It will be noticed that the arms have cutting blades 12 operable in scissor-like fashion to sever the stalk 13 just below the head 7 of the grain. A spring and screw-bolt 14 and 15 are also provided for causing the cutting edges to be advanced upon the stalk in the severing operation. It will be seen that the arms are so spaced on the disks as to prevent their contact with each other in their pivoted and swinging movement around and between the disks—referred to hereinafter. Attention is also directed to the cutting arms, which operate in a scissor fashion, one blade passing over the other, particularly carried out in the modified form in Figure 8.

Referring to Figure 3 it will be observed that the shaft 2 has a cam 16 projecting upwardly between the disks 3 and affixed to the shaft, and also that the cutting arms 8 have each an aperture 17 and between the disks 3 are a number of fingers 18 forming part of a U-shaped base 19. The object of this arrangement is to open the arms as the disks revolve. As the machine is forced or drawn through the crop, these arms are revolved by the chain drive $7^a$ and the heads 7 are gathered, and cut off by the cutting blades 12 of the arms. When an arm has advanced to the position shown in Figure 2, the arms straddle a stalk somewhere beneath the head of grain 7. Continuing its rotation, the arm comes in contact with the base of the head of grain 7 and this impact pulls the finger 18 from the aperture 17. This releases the spring tension and the cutting blades of the arms sever the stalk just below the head of grain. The head of grain is then carried on around and the cam 16 strikes the blunt end 8ª of the arm and forces it upon the fingers 18. This causes the cutting blades of the arm to be forced apart, thus releasing the grain which is deposited in the container or vehicle 5.

The operation of the machine is such that one revolution of the arm is required in the cutting and delivery of a head of grain, and the machine is primarily intended for row crops. Means not shown are provided for raising and lowering the mechanism to provide for general height of the growing crop. Such varying heights of stalks in a general height crop are taken care of by reason of the arms in their rotary movement sliding up the stalks. The shaft 2 carrying the disks and arms has a position in operation which is parallel with each row of plants. Means, also not shown, are provided for straightening up stalks of grain which lean, such means comprising a throat or stalk alining mechanism to cause the heads of grain to come in line with the arms.

It should be understood that minor changes and modifications may be made in the construction of the invention within the scope and meaning of the appended claims.

What is claimed is:

1. A machine of the class described comprising a frame adaptable to being fastened to a vehicle; an axis shaft in the frame and upon which are mounted in spaced-apart relation a plurality of disks; a plurality of rods traversing the outer portions of the disks, said rods carrying a plurality of elements, one between each disk, said rods and elements for holding the disks in proper and rigid relationship; and a plurality of arms pivoted to and between adjacent disks; said arms having divided or separable portions carrying cutting blades for severing heads of grain.

2. A machine as set out in claim 1 and wherein said arms are each pivotally supported between their ends to adjacent disks; and wherein said axis shaft includes a plurality of cams, one cam between adjacent disks, and wherein is disposed on each of said rods traversing said disks and between adjacent disks, a finger; said cams upon rotation of said axis shaft moving against one end of said arms causing said arm to move against said fingers to force the separable portions of the arms apart beneath the head of the grain.

3. A machine as set out in claim 1 and wherein each of said arms carries a spring to force the blades on said separable and divided portions of the arms together when said finger or fingers are released from said separable portions; said release taking place and caused by said arms coming in contact with a head of grain as the disks and arms are revolved.

4. A machine for severing heads of grain from the stalk, comprising a frame including a plurality of disks mounted on an axis, the latter rotatably connected to a source of power; a plurality of arms, of separable scissor-like formation, carried on said disks; said arms including co-acting parts to cause them to open and close to sever and release a head of grain as the shaft or axis is rotated.

In testimony whereof I have signed my name to this specification.

ERNEST H. GRIFFITH.